(12) United States Patent  
Cheng et al.

(10) Patent No.: US 10,217,229 B2  
(45) Date of Patent: Feb. 26, 2019

(54) METHOD AND SYSTEM FOR TRACKING MOVING OBJECTS BASED ON OPTICAL FLOW METHOD

(71) Applicant: CHINA UNIVERSITY OF MINING AND TECHNOLOGY, Xuzhou (CN)

(72) Inventors: Deqiang Cheng, Xuzhou (CN); Leida Li, Xuzhou (CN); Hai Liu, Xuzhou (CN); Guopeng Zhang, Xuzhou (CN); Wei Chen, Xuzhou (CN); Songyong Liu, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 0 days.

(21) Appl. No.: 15/739,779

(22) PCT Filed: Nov. 9, 2015

(86) PCT No.: PCT/CN2015/094146  
§ 371 (c)(1),  
(2) Date: Dec. 26, 2017

(87) PCT Pub. No.: WO2017/000466  
PCT Pub. Date: Jan. 5, 2017

(65) Prior Publication Data  
US 2018/0365843 A1 Dec. 20, 2018

(30) Foreign Application Priority Data  
Jul. 1, 2015 (CN) .......................... 2015 1 0378628

(51) Int. Cl.  
*G06K 9/00* (2006.01)  
*G06T 7/246* (2017.01)  
(Continued)

(52) U.S. Cl.  
CPC .......... *G06T 7/248* (2017.01); *G06K 9/00718* (2013.01); *G06K 9/6202* (2013.01);  
(Continued)

(58) Field of Classification Search  
CPC . G06T 7/248; G06T 7/13; G06T 2207/10016; G06T 2207/20221;  
(Continued)

(56) References Cited

U.S. PATENT DOCUMENTS 6,526,156 B1 * 2/2003 Black ....................... G06K 9/32  
382/103  
7,639,841 B2 * 12/2009 Zhu ..................... G06K 9/00335  
340/435

(Continued)

FOREIGN PATENT DOCUMENTS

| CN | 102074017 A | 5/2011 |
| CN | 103426184 A | 12/2013 |
| CN | 104574435 A | 4/2015 |
| CN | 105023278 A | 11/2015 |

OTHER PUBLICATIONS

Chen et al., "The Comparison and Application of Corner Detection Algorithms", Journal of Multimedia, vol. 4, No. 6, Dec. 2009.*

*Primary Examiner* — Aaron W Carter  
(74) *Attorney, Agent, or Firm* — Gokalp Bayramoglu

(57) ABSTRACT

A method for tracking a moving target based on an optical flow method, including, providing video images, and implementing pre-processing of the images to generate pre-processed images; implementing edge-detection of the pre-processed images and using an optical flow method to extract target information from the pre-processed images, and on the basis of a combination of the edge-detection information and the extracted target information, generating a complete moving target; using an optical flow method to perform estimation analysis of the moving target and using (Continued)

a forward-backward error algorithm based on feature point trace to eliminate light-generated false matching points; and creating a template image and implementing template image matching to track the moving target. The method and system for tracking a moving target based on an optical flow method have the advantages of accurate and complete extraction and the ability to implement stable tracking over a long period of time.

4 Claims, 2 Drawing Sheets

(51) Int. Cl.
  *G06T 7/13* (2017.01)
  *G06K 9/62* (2006.01)
  *G06K 9/80* (2006.01)
(52) U.S. Cl.
  CPC ............ *G06K 9/80* (2013.01); *G06T 7/13* (2017.01); *G06K 2209/21* (2013.01); *G06T 2207/10016* (2013.01); *G06T 2207/20221* (2013.01)
(58) Field of Classification Search
  CPC .... G06K 9/80; G06K 9/00718; G06K 9/6202; G06K 2209/21
  See application file for complete search history.

(56) References Cited

U.S. PATENT DOCUMENTS

| | | | | |
|---|---|---|---|---|
| 8,818,024 | B2* | 8/2014 | Chen | G06K 9/4671 |
| | | | | 348/143 |
| 9,829,984 | B2* | 11/2017 | Dai | G06F 3/017 |
| 9,905,025 | B2* | 2/2018 | Yang | G06T 7/269 |
| 2006/0245500 | A1* | 11/2006 | Yonovitz | G01S 3/7865 |
| | | | | 375/240.19 |
| 2007/0185946 | A1* | 8/2007 | Basri | G06K 9/34 |
| | | | | 708/200 |
| 2010/0245587 | A1* | 9/2010 | Otani | G01C 15/002 |
| | | | | 348/169 |
| 2012/0154579 | A1* | 6/2012 | Hampapur | G06T 7/215 |
| | | | | 348/143 |
| 2013/0286205 | A1* | 10/2013 | Okada | H04N 7/18 |
| | | | | 348/148 |
| 2013/0287249 | A1* | 10/2013 | Wu | G06T 7/254 |
| | | | | 382/103 |
| 2014/0210857 | A1 | 7/2014 | Liu et al. | |
| 2015/0003686 | A1* | 1/2015 | Xiong | G06T 7/204 |
| | | | | 382/107 |
| 2015/0055821 | A1* | 2/2015 | Fotland | G06K 9/3241 |
| | | | | 382/103 |
| 2015/0077323 | A1* | 3/2015 | Ramaswamy | G06F 3/012 |
| | | | | 345/156 |
| 2016/0110885 | A1* | 4/2016 | Blasch | G06T 7/2066 |
| | | | | 382/103 |
| 2018/0268237 | A1* | 9/2018 | Stanimirovic | G06K 9/2018 |

* cited by examiner

METHOD AND SYSTEM FOR TRACKING MOVING OBJECTS BASED ON OPTICAL FLOW METHOD

CROSS REFERENCE TO RELATED APPLICATIONS

This application is the national phase entry of International Application No. PCT/CN2015/094146, filed on Nov. 9, 2015, which is based upon and claims priority to Chinese Patent Application No. 201510378628.X, filed on Jul. 1, 2015, the entire contents of which are incorporated herein by reference.

TECHNICAL FIELD

The present invention relates to the field of video image processing, especially, to a method and a system for tracking a moving object based on an optical flow method.

BACKGROUND

For safe and efficient mining of the coal, the development of the intelligent technologies and equipment aimed at realizing unmanned mining are of great significance for the development of China's coal mining industry. Among them, with the massive use of video surveillance system for the coal mines, the number of major accidents has decreased. However, usually the traditional video surveillance system for the coal mines simply records the video recordings of the monitored scenes and then observes the potential dangers in the scenes with the help of the operators. This kind of video surveillance system needs tremendous human and material resources to realize the observation and processing of massive data. However, a real-time intelligent monitoring system capable of realizing in all-weather is urgently needed in practical applications. By detecting and tracking downhole personnel in real-time, on the one hand, the distribution of the underground personnel can be accurately managed, and on the other hand, it is of significant importance for the coal mines' safety production, alarm and linkage handling, and reporting after the accident. Therefore, moving object tracking for the mines is a very important issue in the coal mines video surveillance.

In a special industrial and mining environment, the captured video images of the underground coal mines have low illumination, great variation, large background noise and uneven noise distribution. In addition, some underground coal mine videos include those captured by both fixed video cameras and vehicle video cameras (the moving cameras).

Most existing designs use the optical flow method to extract the target. Although the target can be extracted in this way, the target contour is not complete.

In the meantime, in the prior art, the next frame of the images is estimated through the current frame by using the optical flow method, but due to the existence of noise, a wrong matching occurs, causing an incorrect target extraction and leading to unsuccessful target tracking.

Therefore, how to design a moving object tracking method with good target extraction and stable target tracking is an urgent problem to be solved in the industry.

SUMMARY OF THE INVENTION

In order to solve the above existing technical problems, the present invention provides a moving object tracking method and system based on the optical flow method, which uses edge-detection and the optical flow method to extract target information from the pre-processed images and creates a template image and performs template image matching to track the target to make accurate and stable tracking for the moving objects.

The present invention provides a method for tracking a moving object based on an optical flow method, which comprises the following steps: providing a video image and pre-processing the video image to generate a pre-processed image; performing an edge-detection on the pre-processed image, and using the optical flow method to extract target information from the pre-processed image, and generating a complete moving target by the fusion of the extracted target information and edge-detection information; using the optical flow method to perform estimation analysis on the moving object and using a forward-backward error algorithm pair based on a feature point trace to eliminate the light-generated false matching points; and creating a template image and implementing template image matching to track the moving object.

Preferably, before using the optical flow method to extract target information from the pre-processed image, a SUSAN corner detection algorithm is used to perform corner-detection on the image and calculate the optical flow under multiple scales.

Preferably, the step of generating a complete moving target by fusion further includes performing binarization on the edge-detected image and the image calculated by the optical flow method.

Preferably, the step of generating a complete moving target further includes fusing edge information and the target information by an AND operation through the following formula:

$$F_{th}(i, j) = \begin{cases} 1 & \text{if } (P_{th}(i, j) = 1 \text{ and } L_{th}(i, j) = 1) \\ 0 & \text{else} \end{cases}$$

where $F_{th}(i,j)$ represents a data-fused image, $P_{th}(i,j)$ represents information of the moving target after edge-binarization, $L_{th}(i,j)$ represents information of the moving target after optical-flow type binarization, $(i,j)$ represents a pixel coordinate of the image.

Preferably, the steps of creating a template image and implementing template image matching to track the moving target include: creating an initial template for use in target tracking; determining the degree of similarity of each point in the template and each point in the image; and using a variable coefficient to update the template.

The present invention also provides a system for tracking a moving target based on an optical flow method, which comprises: an image pre-processing module configured to provide a video image and pre-process the video image to generate a pre-processed image; a target extracting module configured to perform edge-detection on the pre-processed image, and use the optical flow method to extract target information from the pre-processed image, and generate a complete moving target by the fusion of the extracted target information and edge-detection information; a target estimating module configured to use the optical flow method to perform estimation analysis on the moving target and use a forward-backward error algorithm pair based on a feature point trace to eliminate the light-generated false matching points; and a target tracking module configured to create a template image and implement template image matching to track the moving target.

Preferably, when the target extracting module uses the optical flow method to extract target information from the pre-processed image, a SUSAN corner detection algorithm is used to perform corner-detection on the images and calculate the optical flow under multiple scales.

Preferably, the target extracting module further includes a binarization processing module configured to perform binarization on the edge-detected image and the image calculated by the optical flow method.

Preferably, the target extracting module further includes a data fusing module configured to fuse edge information and the target information by an AND operation through the following formula:

$$F_{th}(i, j) = \begin{cases} 1 & \text{if } (P_{th}(i, j) = 1 \text{ and } L_{th}(i, j) = 1) \\ 0 & \text{else} \end{cases}$$

where $F_{th}(i,j)$ represents a data-fused image, $P_{th}(i,j)$ represents information of the moving target after edge-binarization, $L_{th}(i,j)$ represents information of the moving target after optical-flow type binarization, $(i,j)$ represents a pixel coordinate of the image.

Preferably, the target tracking module includes: an initial template creating module configured to create an initial template for use in target tracking; a template matching module configured to determine the degree of similarity of each point in the template and each point in the image; and a template updating module configured to use a variable coefficient to update the template.

Compared to the prior art, the method and system for moving target tracking based on an optical flow method provided by the embodiment of the present invention perform edge-detection on the pre-processed image and uses an optical flow method to extract target information from the pre-processed image, and generate a complete target by the fusion of the extracted target information and edge-detection information and can extract the moving target accurately and completely, and create a template image and implement template image matching to track the moving target, thus realizing a stable tracking over a long period.

Therefore, the moving target tracking method based on the optical flow method in the embodiment of the present invention has the advantages of accurate and complete extraction of the moving targets and a stable tracking over a long period of time.

DETAILED DESCRIPTION OF THE INVENTION

The present invention will be further described below with reference to the accompanying drawings and specific embodiments.

Figure 1:
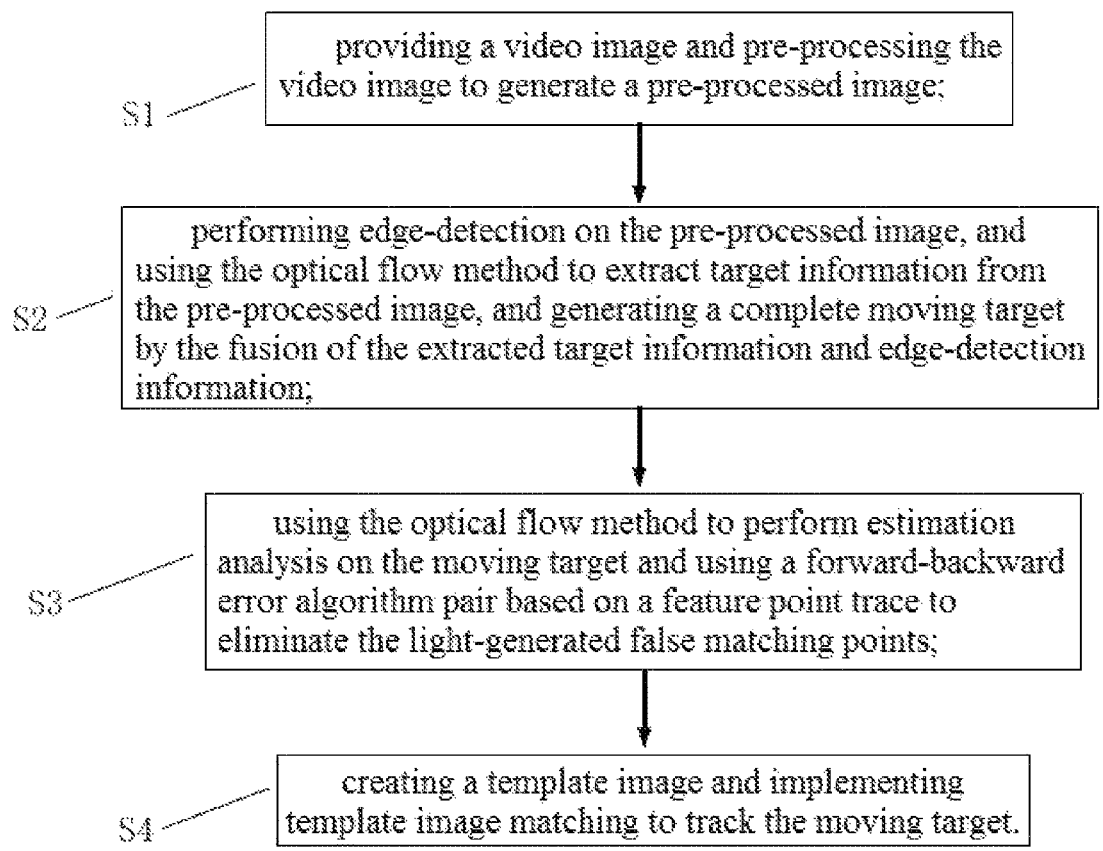
FIG. 1 is a block diagram of a method for tracking a moving target based on an optical flow method according to a preferable embodiment of the present invention.

Referring to FIG. 1, which is a block diagram of a method for tracking a moving target based on an optical flow method according to a preferable embodiment of the present invention. The method for tracking a moving target based on an optical flow method in the present invention comprises the following steps:

In step S1, a video image is provided and pre-processed to generate a pre-processed image.

This step is used to remove the effect of external scenes on the image. This step mainly uses the method including low illumination image enhancement based on Retinex and noise reduction based on wavelet threshold.

In step S2, edge-detection is performed on the pre-processed image, and the optical flow method is used to extract target information from the pre-processed image, and a complete moving target is generated by fusion of the extracted target information and edge-detection information.

In this step, a SUSAN corner detection algorithm is first used to perform corner-detection on the image and calculate optical flow under multiple scales. In the optical flow method, each pixel in the pre-processed image is estimated to obtain the motion vector to achieve the purpose of extracting the target, which causes a large amount of calculation. In the present invention, since the corner-detection of the pre-processed image is first performed by using the SUSAN corner-detection algorithm, the optical flow is estimated only for the corner, thereby reducing the amount of calculation.

However, when the displacement of the moving target in the pre-processed image is large, the accurate optical flow estimation cannot be obtained by the conventional optical flow method. The present invention adopts the idea of the pyramid to calculate the optical flow under multiple scales to improve the accuracy of the optical flow calculation. In the present invention, the pyramid level N=5, and the topmost initial optical flow estimation vector is 0.

Since the illumination of the scene may change in real-time and the illumination has some influence on the accuracy of the optical flow method, the wrong optical flow vector may be obtained when the optical flow method is used.

Figure 2:
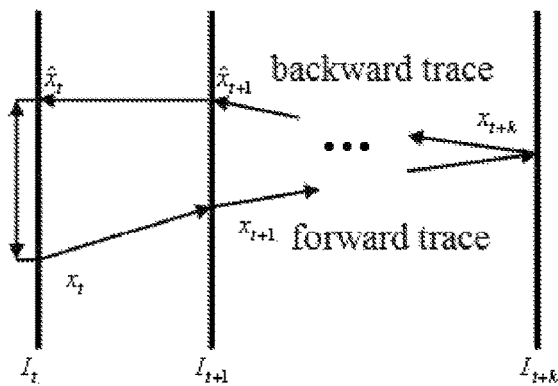
FIG. 2 is a schematic view of a forward-backward error algorithm based on a feature point trace.

Then, the present invention uses the Forward-Backward Error based on the feature point trace to evaluate the reliability of the optical flow estimation, and removes the unreliable optical flow estimation point. The algorithm is shown in FIG. 2. In FIG. 2, $I=(I_t, I_{t+1}, \ldots, I_{t+k})$ is the image sequence, $x_t$ is the position of a point at time t, $x_{t+k}$ is the matching point of $x_t$ estimated k frames forward, $\hat{x}_t$ is the matching point of $x_{t+k}$ estimated k frames backward. At the same time, in order to simplify the calculation, the forward-backward feature point optical flow estimated trace error distance is the Euclidean distance between the initial point $x_t$ of the estimated trace of the forward feature point and the end point $\hat{x}_t$ of the estimated trace of the backward feature point:

$$FB(T_f^k|I) = \|x_t - \hat{x}_t\|$$

In addition, During the edge-detection of moving objects, Prewitt operator is used to process the images.

This step further includes binarization of the edge-detected image and the image calculated by the optical flow method. Specifically, the Maximum Variance Between Clusters Method, abbreviated as OTSU method, has a wider adaptability and provides good image segmentation results. Therefore, the present invention uses the OTSU algorithm to binarize the images. Binary image refers to the image with only black (gray value 0) and white (gray value 1). The binary image not only has small amount of information, leading to fast calculation, but also can be analyzed and characterized subsequently with geometrical concept. Compared with greyscale images, it is much more convenient.

Finally, the present invention fuses the edge information and the target information by an AND operation through the following formula:

$$F_{th}(i, j) = \begin{cases} 1 & \text{if } (P_{th}(i, j) = 1 \text{ and } L_{th}(i, j) = 1) \\ 0 & \text{else} \end{cases}$$

where $F_{th}$ (i,j) represents a data-fused image, $P_{th}$ (i,j) represents information of the moving target after edge-binarization, $L_{th}$ (i,j) represents information of the moving target after optical-flow type binarization, (i,j) represents a pixel coordinate of the image.

After the fusion of the edge information and the target information is completed through the AND operation, the small holes in the data-fused images are filled up and some small areas of non-moving objects due to the influence of external environmental factors are removed. This can be realized by the most basic open operation.

In step S3, the optical flow method is used to perform estimation analysis on the moving target and using a forward-backward error algorithm pair based on a feature point trace to eliminate the light-generated false matching points.

In this step, combining with the step S2, when the optical flow method is used to extract the moving object from the moving field, the position of the target in the next frame is also estimated. Meanwhile, the forward-backward error algorithm pair based on the feature point trace is used to eliminate the false matching points, thereby more accurately determining the location of the target.

In step S4, a template image is created, and the template image matching is performed to track the moving target.

In this step, although the optical flow method can be used to achieve the purpose of tracking the moving target, considering the actual environment, the moving target is less likely to be continuously tracked for a long time due to factors such as obstacle and target overlap. In order to overcome the obstacle and other factors, the present invention adopts a combination of template updating and a moving target tracking algorithm based on the feature optical flow to solve the problem.

For moving target tracking, the moving target extracted from S2 is used to determine the initial template by comparing the gray variance of images. The template similarity is determined, and the template matching is performed according to the Hausdorff distance. The adaptive weighted template updating method is used for updating those templates with the larger deviation. The specific steps are as follows: creating an initial template for use in target tracking; determining the degree of similarity of each point in the template and each point in the image; and using a variable coefficient to update the template.

First, the initial template for the target tracking is created. The quality of the template used to track a moving target has a decisive effect on the accuracy and stability of the movement tracking. When the template is appropriately selected and the proportion of the target is proper, good matching effect can be achieved. When the template position is not appropriately selected, e.g., the proportion of the foreground pixels or the target is small, the background element will have a great impact on the matching results, thereby weakening the impact of the target on the matching. As a result, tracking drift phenomenon occurs easily. The variance of the image can reflect the complexity of an image. When the gray levels in the areas of the selected image are the same, the variance is 0. At this time, the selected area may be a uniform background or the target surface. When both the target and the background of the selected area exist, the variance of this area can reach the maximum. Therefore, the size of the variance in the selected area can be chosen to indicate whether the target and background are suitable in the selected area. Therefore, the present invention adopts this method when determining the initial template. First, the processed centroid of the extracted moving target is taken as the center of the template, and the areas with different sizes are selected to calculate the variance, and the one having the largest variance is selected as the template.

The degree of similarity of each point in the template to each point in the image is determined. In the embodiment of the present invention, the similarity between the template and the current frame of image is determined by using the Hausdorff distance. In S2, feature points have been extracted from the image. In this case, it is only needed to perform matching on the feature points in the template and the current frame of image, which greatly reduces the amount of computation.

For a finite point set A={$a_1$, $a_2$, . . . , $a_m$} and B={$b_1$, $b_2$, . . . , $b_n$}, the Hausdorff distance between A and B is as below.

$$H(A, B) = \max[h(A, B), h(B, A)]$$

where $$h(A, B) = \max_{a_i \in A} \min_{b_j \in B} \|a_i - b_j\|$$

$$h(B, A) = \max_{b_j \in B} \min_{a_j \in A} \|b_j - a_i\|$$

wherein, $\|\bullet\|$ denotes some kinds of distance norm between points A and B. The function h (A,B) is called the directional Hausdorff distance from point set A to B, and the function h (B,A) is called the directed Hausdorff distance from point set B to A.

In the embodiment of the present invention, the number of effective matching points between the template and the search area of the current frame is used as the matching criterion. Assuming that the motion area estimated by the optical flow is c, the search area of 1.2*c is used for matching due to obstacle and other issues to ensure the tracking of blocked objects:

$$S(x) = \sum_{l=1}^{L} p(x)$$

$$p(x) = \begin{cases} 1 & H(a_i, B) \leq d_0 \\ 0 & H(a_i, B) > d_0 \end{cases}$$

where the range of i is (1, L), L is the number of feature points in the template. When the Haurdorff distance between the template and the corresponding feature point in the corresponding area of the current frame of image is less than the threshold $d_0$, the matching point is a valid matching point and S(x) accumulates. Otherwise, it is an invalid matching point. Finally, the value of S(x) is analyzed. If S(x) is smaller than the sum of the number of valid matching points, i.e., the threshold $T_s$, if the original template is continued to be used, the tracking target will get lost. Therefore, the template updating strategy is considered. In the present invention, $d_0=3$, and $T_s=45$.

Finally, the template is updated with the variable coefficients. The traditional method for updating adaptive template uses the fixed coefficient α to update the template, which cannot adapt to the change of the environment. In the embodiment of the present invention, the template is updated with a variable coefficient. The present invention sets a as the Haurdorff distance 1/n H(A,B) (where n is the number of feature points in template B) to enable adaptive template updating. This is realized as follows:

$$T_{k+1} = \begin{cases} T_k + \frac{1}{n}H(A,B)(I_k - T_k) & S(x) \le T_s \\ T_k & S(x) > T_s \end{cases}$$

where $T_k$ represents the currently used template, $I_k$ represents the best matching subgraph found in the current frame, $T_{k+1}$ represents the updated template, and S(x) and $T_s$ correspond to the number of valid matching points and their sum in the previous step. In this way, compared with the traditional α update method, the present invention can update the template according to the actual offset of the feature point, which increases the adaptive anti-blocking capability of the target while retaining the real information of the moving target of the image.

Compared with the prior art, the moving target tracking method based on the optical flow method in the embodiment of the present invention can accurately and completely extract the moving target by performing edge detection on a pre-processed image and using the optical flow method to extract the target information from the pre-processed image and generating a complete moving target by fusion of the edge detection information and the extracted target information, and create a template image and implement template image matching to track the moving target, thereby realizing a stable tracking over a long period.

Therefore, the moving target tracking method based on the optical flow method in the embodiment of the present invention can realize accurate and complete extraction of the moving targets and a stable tracking over a long period of time.

Figure 3:
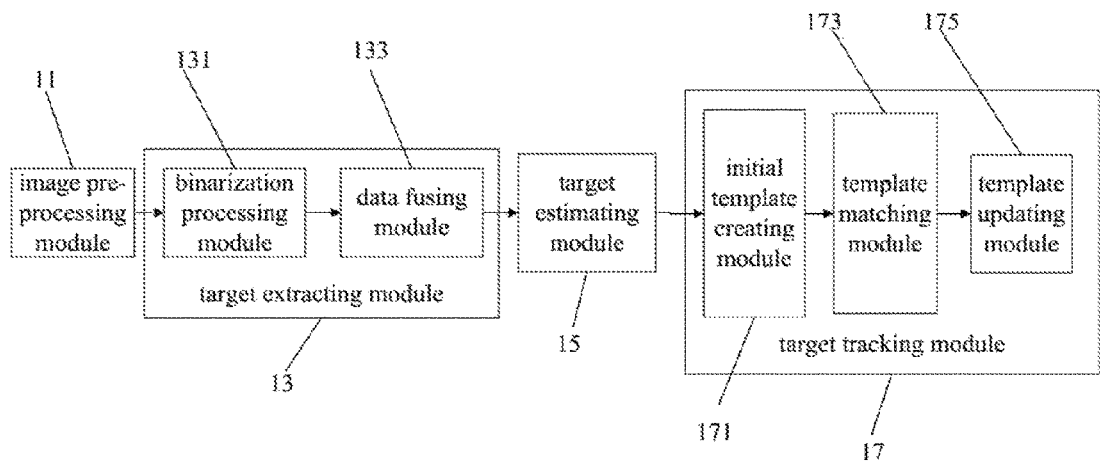
FIG. 3 is a block diagram of a system for tracking a moving target based on an optical flow method according to a preferable embodiment of the present invention.

Referring to FIG. 3, which is a block diagram of a system for tracking a moving target based on an optical flow method according to a preferable embodiment of the present invention. The present invention also provides a system for tracking a moving target based on an optical flow method, which comprises an image pre-processing module 11, a target extracting module 13, a target estimating module 15, and a target tracking module 17.

The image pre-processing module 11 is used to provide a video image and pre-process the video image to generate a pre-processed image.

The target extracting module 13 is used to perform edge-detection on the pre-processed image, and use the optical flow method to extract target information from the pre-processed image, and generate a complete moving target by fusion of the extracted target information and edge-detection information.

The target estimating module 15 is used to use the optical flow method to perform estimation analysis on the moving target and use a forward-backward error algorithm pair based on a feature point trace to eliminate the light-generated false matching points.

The target tracking module 17 is used to create a template image and implement template image matching to track the moving target.

Further, the edge detection is achieved by performing Prewitt operator on images.

Further, when the target extracting module 13 uses the optical flow method to extract target information from the pre-processed image, a SUSAN corner detection algorithm is used to perform corner-detection on the image and calculate optical flow under multiple scales.

Further, the target extracting module further includes a binarization processing module 131 used to perform binarization on the edge-detected image and the image calculated by the optical flow method and a data fusing module 133 used to fuse edge information and the target information by an AND operation through the following formula:

$$F_{th}(i,j) = \begin{cases} 1 & \text{if } (P_{th}(i,j) = 1 \text{ and } L_{th}(i,j) = 1) \\ 0 & \text{else} \end{cases}$$

where $F_{th}$ (i,j) represents a data-fused image, $P_{th}$ (i,j) represents information of the moving target after edge-binarization, $L_{th}$ (i,j) represents information of the moving target after optical-flow type binarization, (i,j) represents a pixel coordinate of the image.

Further, the target tracking module 17 includes an initial template creating module 171 used to create an initial template for use in target tracking, a template matching module 173 used to determine the degree of similarity of each point in the template and each point in the image, and a template updating module 175 used to use a variable coefficient to update the template.

Compared with the prior art, the moving target tracking system based on the optical flow method in the embodiment of the present invention can accurately and completely extract the moving target by performing edge detection on a pre-processed image and using the optical flow method to extract the target information from the pre-processed image and generating a complete moving target by fusion of the edge detection information and the extracted target information through the target extracting module 13, and can achieve long-term stability of the moving target tracking by creating a template image and performing template image matching to track the moving target through the target tracking module 17.

The foregoing is a further detailed description of the present invention in conjunction with specific preferred embodiments, and it should not be considered that the specific implementation of the present invention is limited to these descriptions. Those skilled in the art to which the present invention pertains may also make some simple deductions or replacements without departing from the concept of the present invention and all these should be considered as falling within the scope of protection of the present invention.

We claim:

1. A method for tracking a moving target based on an optical flow method, comprising the following steps:
    providing a video image and pre-processing the video image to generate a pre-processed image;
    performing edge-detection on the pre-processed image to obtain an edge-detection information, and using the optical flow method to extract target information from the pre-processed image, and generating a complete moving target by fusion of the edge-detection information and the extracted target information;

using the optical flow method to perform estimation analysis on the moving target and using a forward-backward error algorithm pair based on a feature point trace to eliminate a light-generated false matching point; and creating a template image and implementing a template image matching to track the moving target;

wherein the step of generating a complete moving target further comprises fusing the edge-detection information and the target information by an AND operation through the following formula $$F_{th}(i, j) = \begin{cases} 1 & \text{if } (P_{th}(i, j) = 1 \text{ and } L_{th}(i, j) = 1) \\ 0 & \text{else} \end{cases}$$

where $F_{th}$ (i,j) represents a data-fused image, $P_{th}$ (i,j) represents information of the moving target after edge-binarization, $L_{th}$ (i,j) represents information of the moving target after optical-flow type binarization, (i,j) represents a pixel coordinate of the image.

2. The method according to claim 1, wherein the step of using the optical flow method to extract target information from the pre-processed image further comprises, using a SUSAN corner detection algorithm to perform corner-detection on the video image and calculating optical flow under multiple scales.

3. The method according to claim 1, wherein the step of generating a complete moving target by the fusion of the edge-detection information and the extracted target information further comprises performing binarization on the edge-detection information and the target information.

4. The method according to claim 1, wherein the step of creating a template image and implementing template image matching to track the moving target comprises, creating an initial template for use in the target tracking;

determining a degree of similarity between each point in the template and each point in the image; and using a variable coefficient to update the template.

* * * * *